Patented Jan. 11, 1944

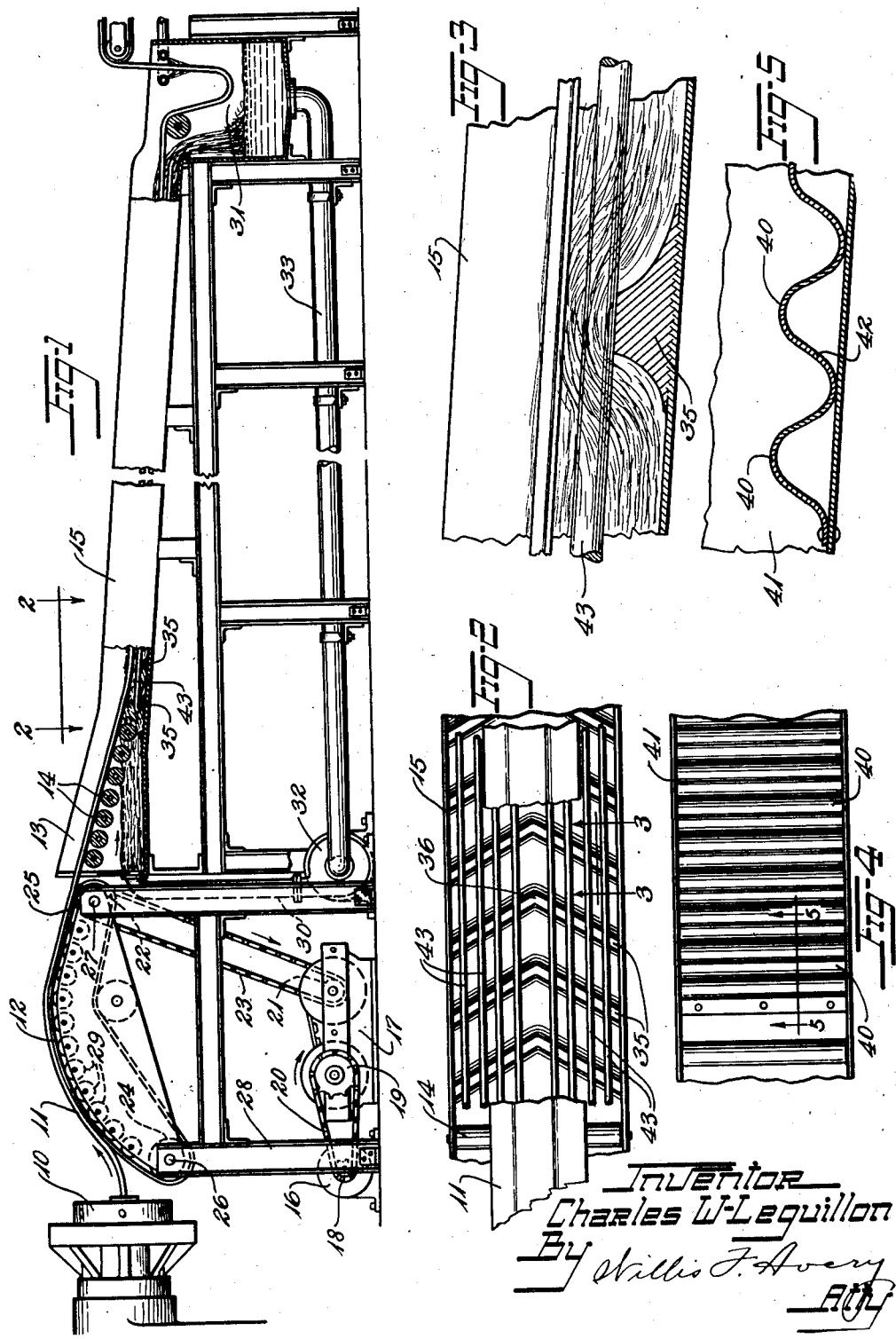

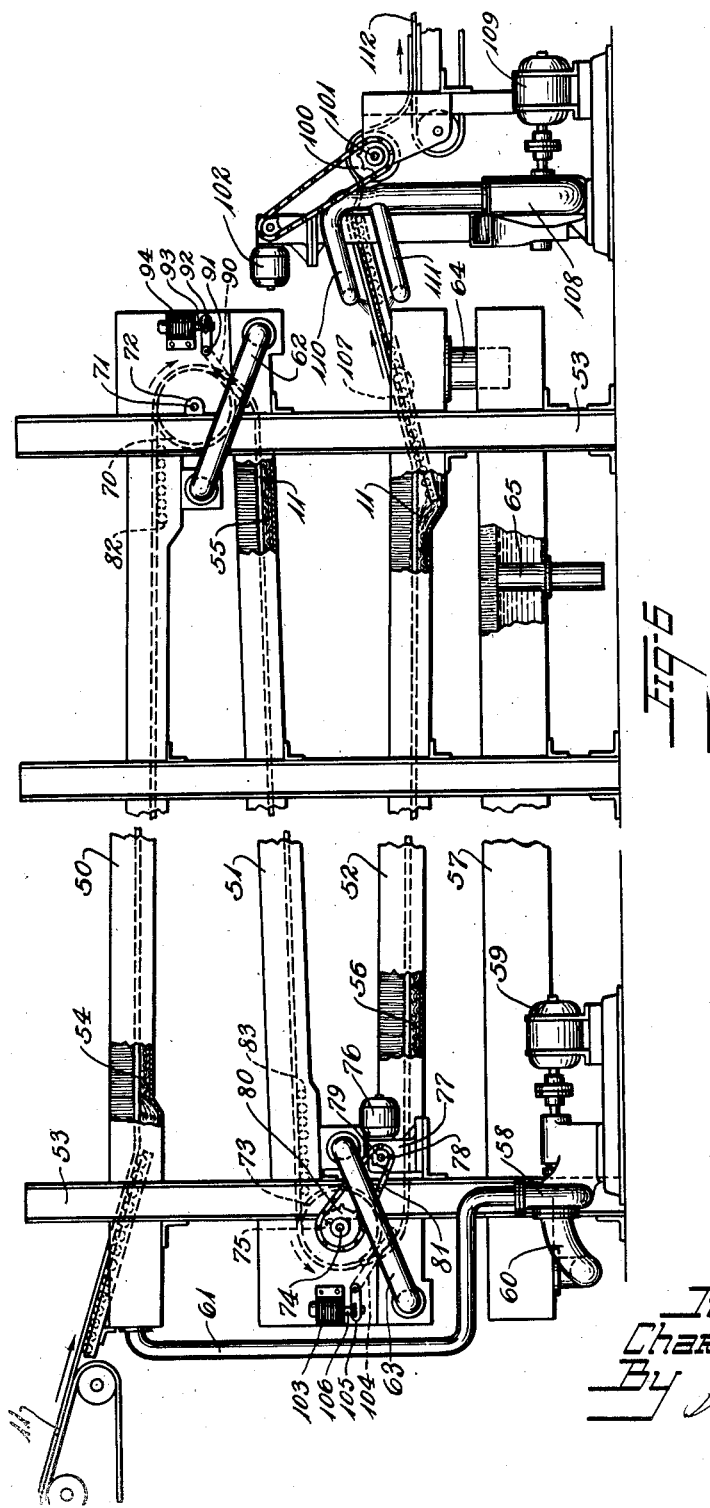

2,338,770

UNITED STATES PATENT OFFICE 2,338,770

METHOD AND APPARATUS FOR TREATING STRIP PLASTIC MATERIAL

Charles W. Leguillon, Akron, Ohio, assignor to The B. F. Goodrich Company, New York, N. Y., a corporation of New York Application November 6, 1942, Serial No. 464,724

13 Claims. (Cl. 18—2)

This invention relates to the treatment of strip plastic material and is especially useful in the treatment of strips of plastic rubber or other rubber-like material after it has been formed as a strip.

In the manufacture of rubber and other rubber-like plastic materials in strip form and of gravity higher than water, as in case of tire tread stock, by extruding or calendering, the warm plastic material is subjected to considerable pressure and manipulation so that it is delivered in strip form subject to internal strains and, in cooling, shrinks greatly in length if not restrained, with a corresponding thickening of cross-section, especially at ends of the strip. It is therefore advisable so to treat the strip material as to neutralize the strains, reduce its temperature, and provide a cut strip that can hold its dimensions during brief storage and during building operations, as in the case of strip stock for tire treads.

Heretofore, devices as have been proposed for cooling the strip material have either provided for support of the strips by conveyor devices during their passage through a cooling liquid, in which case the strips have not been free to adjust themselves longitudinally, or the unsupported strips have sunk in the cooling bath and have been dragged through cooling liquid in such manner as to prevent proper adjustment due to contact of the strip with the bottom or sides of the container, and in some instances even to stretch it objectionably.

The present invention aims to overcome the foregoing and other difficulties, and to provide improved apparatus and procedure.

The principal objects of the invention are to provide longitudinal compacting of the strip, to provide for cooling of the strip substantially without restraint of the strip other than by frictional contact with a cooling liquid, to provide for uniform cooling and sizing of the strip progressively, to provide control of shrinkage, to provide effective lifting forces along a cooling bath for keeping the strip in suspension in the cooling liquid while advancing the strip, and to provide for keeping the strip away from the surfaces of the apparatus.

These and other objects will appear from the following description and the accompanying drawings.

Of the drawings,

Fig. 1 is a longitudinal elevation, partly in section, of one embodiment of the invention, parts being broken away.

Fig. 2 is a detail plan view of the cooling trough, parts being broken away.

Fig. 3 is an enlarged sectional view taken on line 3—3 of Fig. 2.

Fig. 4 is a view similar to Fig. 2 but showing a modification.

Fig. 5 is an enlarged cross-sectional view taken on line 5—5 of Fig. 4.

Fig. 6 is a side elevation, partly in section, showing another modification of the invention.

In accordance with the invention a warm plastic strip of unvulcanized rubber or other rubber-like material is delivered progressively by a conveyor over a flight of retarding rollers to compact it longitudinally and is led to a trough of cooling liquid, a flow of cooling liquid is maintained in the trough in the direction of advance of the strip and in a sinuous course with respect to a vertical plane, obtained by a riffle or rapid in the flowing liquid, so that at intervals along the trough the strip is subjected to upwardly directed flow forces which act to sustain the strip above the bottom of the trough and in suspension in the liquid. Flow forces may also be directed toward the center of the trough to effect the greatest lifting force at the center and to keep the strip centered in the trough. In one form of the invention a series of troughs are provided and the speed of feeding to one trough is controlled by the condition of the strip coming from a preceding trough. Preferably the material has had opportunity to recover from substantially all mechanical strains resulting from previous extruding or other working operations prior to its entry into the bath so that it can avail itself of substantially its entire travel in the bath for cooling without strain adjustment.

Referring to the drawings, and first to Figs. 1 to 3 inclusive, the numeral 10 designates an extruding machine adapted to form progressively a strip 11 of plastic material such as unvulcanized rubber or other rubber-like material. The strip shown is a tire tread although strips of other forms may be similarly produced. A feeding conveyor 12 is aligned with the extruding machine to receive and convey the strip to the cooling mechanism, and in order to provide for good adhesion of the strip to the belt, the conveyor has its upper strip-receiving flight inclined upwardly and then downwardly. The conveyor belt discharges the strip material over an inclined flight 13 of free running rolls 14 aligned with the downwardly running delivery reach of the belt, each roll being journaled on friction reducing bearings. This flight of rollers is inclined downwardly to deliver the strip to a trough 15 at an acute angle, preferably at about 15 degrees to the horizontal.

Belt 12 is driven by a motor 16 through a variable speed drive 17 of the Reeves type which may be regulated at will by the operator to drive the strip forward at any desired speed. Motor 16 has a sprocket 18 fixed to its shaft which drives a sprocket 19 of the variable speed drive through a chain 20. The variable speed drive in turn has a sprocket 21 which drives a sprocket 22 on the conveyor through a chain 23. Conveyor 12 is trained about pulleys 24, 25 fixed to shafts 26, 27 respectively. Shafts 26, 27 are journaled in a frame 28, and sprocket 22 is fixed to shaft 27. Guide rollers 29 may also be journaled in the frame 28 for supporting the upper reach of the conveyor belt and may be so arranged as to cause the upper reach to bow upwardly although this is not necessary. The bowed arrangement provides for greater adhesion of the strip to the conveyor belt for positive driving as any stretching of the strip causes strains which may be resolved into force components directed against the face of the belt throughout the extent of the upper reach of the belt.

The arrangement is such that the conveyor belt speed may be varied at will by the operator and by increasing the speed of the belt the strip is progressively compacted due to friction of the rollers 14. While sufficient friction to retard and longitudinally compress the plastic strip may be obtained by the use of free-running rolls, braking means may be applied thereto to increase friction if more longitudinal compression is desired. In this manner it is possible for the strip to recover substantially from the strains induced in it in the extruding operation all by the time the strip reaches the bottom of the flight 13 of rollers, so that but little or no shortening of the strip need occur during the subsequent cooling operation.

The trough 15 is supported by the frame 28 and is slightly inclined to the horizontal. A pipe 30 supplies a flow of water or other cooling liquid along the trough to its lower end where it collects in a catch basin 31. A pump 32 may be employed to circulate the water and is supplied by a suction pipe 33 from the catch basin from which it returns the water through pipe 30 to the upper end of the trough.

The specific gravity of rubber compositions such as are employed for tire treads are usually slightly greater than that of water so that ordinarily the rubber strip would drag along the bottom of the trough and be retarded considerably by friction so as to stretch the strip. To avoid this the trough is provided with riffle bars 35 secured across its bottom at spaced-apart intervals. These riffles partially obstruct the trough so that the water flowing down the trough is forced upwardly at each riffle exerting an upwardly-directed force against the strip and raising the strip clear of the obstruction because of the inertia of the water. The liquid is thereby formed with a series of standing waves, the crest of each wave tending to aquaplane the strip therealong while cooling it.

The arrangement is such that the strip is urged along the trough only by friction of the water contacting with it which is very small and, due to the superior speed of the water, no drag of the strip is permitted. Consequently, as the friction of the liquid is relatively low, the strip is free to shrink, if it needs to shrink, without substantial external resistance.

The strip may be delivered to the trough substantially free from tension, and it has been found that by adjusting the speed of conveyor belt 12 the strip may be compressed longitudinally before it enters the cooling liquid so that subsequent cooling leaves the strip at very nearly in the condition as to dimensions at which it entered the bath of liquid.

To provide for keeping the strip clear of the sides of the trough, the riffles 35 may converge at the center of the trough, as at 36 as shown in Fig. 2, in the direction of flow and of movement of the strip thereby concentrating the lifting forces at the center of the trough. This arrangement is also useful where strips such as tire tread strip having a greater thickness at the center than at the margins is to be produced as the greatest lifting forces are then concentrated at the zone of greatest weight. To prevent sagging of the strip between the riffles should movement of the strip or liquid or both be suspended, longitudinally extending bars 43 may be placed in the trough above the riffle bars.

In the modification shown in Figs. 4 and 5, the riffles 40 extend directly across the trough 41 at right angles thereto and may be formed by attaching a corrugated sheet 42 of sheet material to the bottom of the trough or by constructing the trough with a bottom of corrugated sheet metal.

Where the strip material is of great cross-section and thickness requiring long troughs for cooling, as with tread slabs for large tires, the treating apparatus may be arranged to conserve floor space and prevent stretching of the strip as in the modification of Fig. 6 where successive cooling troughs 50, 51, 52 are arranged one beneath the other and supported by a frame 53. Each of the troughs is provided with riffles 54, 55, 56 respectively along its bottom, the riffles corresponding in construction to either the construction of Figs. 2 and 3 or to that of Figs. 4 and 5. A supply tank 57 for cooling water may be provided below trough 52. A pump 58 driven by a motor 59 is arranged to draw cooling water from tank 57 through a pipe 60 and supply it to the receiving end of trough 50 through a pipe 61. Water discharged from the delivery end of trough 50 is delivered through a pipe 62 to the receiving end of trough 51 directly therebelow and sloping in the opposite direction. Water from the delivery end of trough 51 is delivered to the receiving end of trough 52 therebelow, by a pipe 63. Water discharged from the delivery end of trough 52 is returned to tank 57 through a pipe 64. An overflow pipe 65 extends into tank 57 for discharge of excess water, and a supply line (not shown) is provided for filling the system or to make up losses due to evaporation or leakage. Refrigeration coils (not shown) may be installed in tank 57 to keep the temperature of the cooling water constant.

As the strip material is of great length and would be restrained principally by friction of the water, means are provided for preventing the inertia of the strip from stretching it, so that it is permitted to cool without stretching. It is also necessary to guide the strip material from one trough into the succeeding one. For this purpose, the following mechanism is provided:

A guide pulley 70 is mounted on a horizontal shaft 71 freely rotatable in bearings 72 fixed to frame 53 at the delivery end of trough 50. The strip travels about the pulley and along trough 51 in the opposite direction. A similar pulley 73 is located at the delivery end of trough 51 and is fixed to a shaft 74 rotatable in bearings 75 on frame 53. An electric motor 76 is mounted on frame 53 and has a speed reducer 77 directly connected thereto from which a drive shaft 78 extends. A sprocket 79 fixed to shaft 78 drives a sprocket 80 fixed to shaft 74 through a chain 81.

A feeler arm 90 is fixed to a shaft 91 pivoted on frame 53 adjacent pulley 70 in a position to contact a free reach of the strip as the strip leaves pulley 70. A lever 92 fixed to shaft 91 is pivotally connected to an armature 93 movable with respect to a solenoid 94 fixed to frame 53. Solenoid 94 is a part of the control circuit of motor 76, the control system being of the "Thyratron" type in which the relation of the armature 93 with respect to the solenoid varies the impedance of the solenoid to current passing to the grid of a "Thyratron" tube which controls the speed of the motor. The arrangement is such that when the reach of the strip at the feeler arm 90 shortens, it reduces the speed of motor 76 and prevents pulley 73 from stretching the strip, and as the reach lengthens, it speeds up motor 76 to take up the slack.

A pulley 100 is fixed to a horizontal shaft 101 at the delivery end of trough 52. Shaft 101 is driven by a motor 102 through suitable gearing similar to the gearing, previously described, which drives pulley 73 from motor 76. A Thyratron control circuit controls the speed of motor 102 and includes a solenoid 103. A feeler arm 104 is pivotally mounted on frame 53 near pulley 73 so as to contact a free reach of strip material as it passes from pulley 73 to trough 52 and an arm 105 fixed to the feeler arm supports the armature 106 of solenoid 103. The arrangement is such that the speed of pulley 100 is controlled by the condition of the reach of stock leaving pulley 73 and stretch of the strip through trough 52 is prevented.

For guiding the strip between trough 50 and pulley 70, a series of parallel free-running guide rolls 82 are provided and similar guide rolls 83 are provided between the delivery end of trough 51 and pulley 73 for supporting the strip. At the delivery end of trough 52 an inclined run of free rolling rollers 107 are provided to guide the strip over pulley 100.

For drying the strip as it leaves trough 52, a blower 108 directly driven by a motor 109 is provided with discharge pipes 110, 111 above and below the strip. The arrangement is such that air is blown against the strip to dry the moisture therefrom. Pulley 100 delivers the treated and dried strip to a conveyor belt 112.

Due to the fact that the strip is out of contact with the troughs substantially throughout its length by reason of the upwardly directed force of the liquid at the riffles along the troughs, and the strip is prevented from stretching by the control of speed of the pulleys about which it travels at the ends of the troughs, cooling may be effected without objectionable change in dimensions of the strip from those it possesses upon entry into the cooling bath.

Conservation of cooling fluid is also accomplished as the only loss is by leakage and evaporation, while floor space is conserved by the arrangement of a plurality of cooling troughs one above another.

Variations may be made without departing from the scope of the invention as it is defined by the following claims.

I claim:

1. The method of treating strip plastic material which comprises feeding the strip material into a running bath of cooling liquid, and directing the liquid so that its surface tends to follow a path upwardly inclined at spaced-apart intervals along the bath to direct a series of lifting forces against the strip in the bath.

2. The method of treating strip plastic material which comprises feeding the strip material through a bath of cooling liquid, and causing a series of waves in the liquid to provide a series of consecutive upwardly directed forces against the strip for sustaining the strip in the liquid.

3. The method of treating strip plastic material which comprises providing a rapid flow of cooling liquid along a course, feeding the strip material into the liquid and partially obstructing the flow at intervals along the course beneath the surface of the liquid to form a series of upwardly directed waves for sustaining the strip in the liquid.

4. The method of treating strip plastic material which comprises providing a rapid flow of cooling liquid along a series of substantially horizontal courses, partially obstructing the flow of liquid along each course at intervals by riffles at the floor of the course to form series of upwardly directed wave crests at the surface of the liquid, progressively feeding the strip material along the first course into a free reach of strip between the first and second courses, feeding the strip progressively into the second course from said free reach, controlling the feeding speed to said second course from the degree of slack of said free reach, and sustaining the strip in the cooling liquid along said courses by the forces of the upwardly directed flow at said wave crests.

5. The method of treating strip plastic material which comprises directing a flow of cooling liquid in a generally horizontal direction along a riffle course to provide a series of upwardly directed wave crests, feeding the strip material into said liquid, and sustaining the strip in the liquid throughout the course by flow forces at said wave crests.

6. The method of treating freshly worked strip rubber-like material which comprises progressively longitudinally compressing the freshly worked strip to relieve it dimensionally in a large measure from the strains of the working, then feeding the strip into a bath of flowing cooling liquid and directing the liquid into a series of wave crests for sustaining the strip in the liquid substantially without imposing dimension-changing stress on the strip.

7. Apparatus for treating strip plastic material comprising a bath of cooling liquid, means for feeding the strip material into the bath, and means directing the liquid up and down in a sinuous path so that its surface follows a path inclined upwardly at spaced-apart intervals along the bath to direct a series of lifting forces against the strip in the bath.

8. Apparatus for treating strip plastic material, said apparatus comprising a trough for directing a flow of cooling liquid in a generally horizontal direction, means for feeding a strip progressively into said trough, means for supplying liquid to said trough, and riffle means in said trough for effecting flow of said liquid up and down sinuously in a series of upwardly flowing wave crests in said liquid for sustaining said strip during its travel along the trough.

9. Apparatus for treating strip plastic material, said apparatus comprising a plurality of successive troughs for directing flow of cooling liquid in generally horizontal directions, means for feeding a strip progressively into the first trough, means for supplying liquid to said first trough, a second feeding means for feeding the strip progressively from said first trough into a succeeding trough, means controlled by a free reach of the strip between said first trough and said succeeding trough for regulating the speed of said second feeding means, means for supplying a liquid to said succeeding trough, and means in said troughs for effecting a series of upwardly flowing wave crests in the liquid therealong for sustaining said strip during its travel along said trough.

10. Apparatus for treating strip plastic material, said apparatus comprising a trough for directing a flow of cooling liquid in a generally horizontal direction, means for feeding a strip progressively into said trough, means for supplying liquid to said trough, riffle means in said trough for effecting a series of upwardly flowing wave crests in said liquid for sustaining said strip during its travel along said trough, and means in said trough above the riffle means for supporting said strip against sagging upon cessation of the wave crests.

11. Apparatus for treating strip plastic material, said apparatus comprising a plurality of successive troughs for directing flows of cooling liquid in generally horizontal directions, means for feeding a strip progressively into the first trough, means for supplying liquid to said first trough, a second feeding means for feeding the strip progressively from said first trough into a succeeding trough, means controlled by a free reach of the strip between said first trough and said succeeding trough for regulating the speed of said second feeding means, means for supplying a liquid to said succeeding trough, and means in said troughs for effecting a series of upwardly flowing wave crests in the liquid therealong for sustaining said strip during its travel along said trough, said last-named means being arranged to converge toward the center of the trough in the direction of flow.

12. Apparatus for treating strip plastic material, said apparatus comprising a trough for directing a flow of cooling liquid, and means in said trough for diverting the liquid at its surface upwardly at spaced-apart positions along the trough for sustaining the strip in the flowing liquid, the diverting means converging to the center of the trough in the direction of flow.

13. Apparatus for treating strip plastic material, said apparatus comprising a conveyor for delivering the hot strip, rotatable means engaging the strip at the delivery end of the conveyor for retarding the strip and longitudinally compacting it, and means for cooling the compacted strip without substantial stretch thereof, said cooling means comprising means for providing a stream of cooling liquid flowing in the direction of travel of the strip, and means for directing the flow at the surface of the liquid upwardly at positions along the stream for sustaining the strip in the stream throughout its cooling period.

CHARLES W. LEGUILLON.